(12) United States Patent
Kimino

(10) Patent No.: US 7,398,684 B2
(45) Date of Patent: Jul. 15, 2008

(54) SEMICONDUCTOR SENSOR HAVING WEIGHT OF MATERIAL DIFFERENT THAN THAT OF WEIGHT ARRANGING PART

(75) Inventor: Kazunari Kimino, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/369,283

(22) Filed: Mar. 6, 2006

(65) Prior Publication Data

US 2007/0240510 A1  Oct. 18, 2007

(30) Foreign Application Priority Data

Mar. 9, 2005 (JP) ............... 2005-066342

(51) Int. Cl.
*G01P 15/08* (2006.01)
(52) U.S. Cl. ................. 73/514.38; 73/514.33
(58) Field of Classification Search ............. 73/514.01, 73/514.36, 514.38, 514.33
See application file for complete search history.

(56) References Cited

U.S. PATENT DOCUMENTS 4,893,509 A * 1/1990 MacIver et al. .......... 73/514.29
5,905,044 A * 5/1999 Lee et al. .................. 148/537
6,629,462 B2 * 10/2003 Otsuchi et al. ........... 73/514.34
2005/0160814 A1 * 7/2005 Vaganov et al. .......... 73/514.01

FOREIGN PATENT DOCUMENTS

| JP | 52-36395 | 9/1977 |
|---|---|---|
| JP | 2-139216 | 5/1990 |
| JP | 3-115978 | 5/1991 |
| JP | 4-240792 | 8/1992 |
| JP | 5-322566 | 12/1993 |
| JP | 7-280829 | 10/1995 |
| JP | 8-7228 | 1/1996 |
| JP | 2004-87598 | 3/2004 |
| JP | 2004-111671 | 4/2004 |
| JP | 2004-245760 | 9/2004 |
| JP | 2004-273679 | 9/2004 |

* cited by examiner

*Primary Examiner*—John E Chapman
(74) *Attorney, Agent, or Firm*—Cooper & Dunham, LLP

(57) ABSTRACT

A semiconductor sensor is disclosed that includes a substrate including at least a semiconductor layer. The substrate includes a weight arranging part in the vicinity of the center of the substrate, a flexible part around the weight arranging part, and supporting parts provided around the flexible part. The semiconductor sensor further includes a weight arranged on the weight arranging part. The weight is made of a material different from that of the weight arranging part and the flexible parts.

14 Claims, 13 Drawing Sheets

SEMICONDUCTOR SENSOR HAVING WEIGHT OF MATERIAL DIFFERENT THAN THAT OF WEIGHT ARRANGING PART

BACKGROUND OF THE INVENTION

1. Field of the Invention

The present invention generally relates to a semiconductor sensor having a piezoresistance element such as a semiconductor acceleration sensor and a semiconductor angular velocity sensor and a method of manufacturing the same. More specifically, the present invention relates to a semiconductor sensor and a method of manufacturing the same in which the position of a weight shifts, which weight is supported by a flexible part where a piezoresistor is formed so as to detect a change in resistance of the piezoresistor, and thereby the sensor measures acceleration.

The semiconductor sensor is used for measuring the acceleration of a moving car in a forward direction or in a crosswise direction. The semiconductor sensor is also used for measuring the degree of jiggling of a hand upon using a camcorder.

In the present specification, a semiconductor substrate includes not only a substrate in which only a semiconductor is used but also an SOI (Silicon-on-Insulator) substrate in which an insulating film is formed therein.

2. Description of the Related Art

As for the semiconductor sensor, an acceleration sensor which is mounted on a car is publicly known. For example, as shown in FIGS. 10A through 10D, a cantilever acceleration detection unit in which a piezoresistor is used is disclosed in Japanese Patent Application Publication No. H8-7228.

FIGS. 10A through 10D are views illustrating a conventional semiconductor sensor. FIG. 10A is a perspective view. FIG. 10B is a plan view. FIG. 10C is a cross-sectional view taken along a line A-A' shown in FIG. 10B. FIG. 10D is a cross-sectional view taken along a line B-B' shown in FIG. 10B.

A semiconductor sensor 71 is formed by processing an SOI substrate 3 in which an insulating layer 7 is sandwiched between a second semiconductor layer 5 and a semiconductor layer 9.

On a surface side 3a of the SOI substrate 3, plural flexible parts 73 comprising the semiconductor layer 9 are formed adjacent to a supporting part 11 comprising the SOI substrate 3, which supporting part 11 is shaped as a frame. The flexible parts 73 are connected to the supporting part 11. In the semiconductor layer 9 of each of the flexible parts 73, a piezoresistor 19 is formed.

In the vicinity of the center of the semiconductor sensor 71, a weight 75 is formed apart from the supporting part 11, which weight 75 comprises the semiconductor layer 9, the insulating layer 7, and the second semiconductor layer 5. The semiconductor layer 9 of the weight 75 is linked to the semiconductor layer 9 of the flexible parts 73, and thereby, the weight 75 is supported by the flexible parts 73.

On the surface 3a of the SOI substrate 3, an insulating film 21 is formed. In FIGS. 10A and 10B, the piezoresistors 19 are shown for the sake of convenience. On the insulating film 21, plural metal wiring patterns 23 and plural pad electrodes 25 are formed. The metal wiring patterns 23 are electrically connected to the corresponding piezoresistors 19 via through holes formed in the insulating film 21.

On the insulating film 21 including a region where the metal wiring patterns 23 are to be formed, a protection film 27 is formed. In the protection film 27 on the pad electrodes 25, an opening is formed. In FIGS. 10A and 10B, the protection film 27 is not shown.

A glass substrate 29 is bonded onto the supporting part 11 on the other side 3b of the SOI substrate 3 by an anodic bonding. An edge surface of the weight 75 is apart from the glass substrate 29.

FIGS. 11A through 11F are cross-sectional views illustrating the semiconductor sensor taken along the line A-A' shown in FIG. 10B. A brief description is given of a manufacturing method of a conventional semiconductor sensor with reference to FIGS. 10A through 11F.

(1) Referring to FIG. 11A, a thermal oxide film 69 is formed on the other side 3b of the SOI substrate 3 comprising the second semiconductor layer 5, the insulating layer 7 and the semiconductor layer 9. Then, the piezoresistor 19 is formed in the vicinity of the surface of the semiconductor layer 9 of the surface 3a of the semiconductor sensor 3. The insulating film 21 is formed on the surface 3a of the semiconductor layer 9. In a certain region of the insulating film 21, a through hole is formed. Next, on the insulating film 21 including the region where the through hole is formed, the metal wiring patterns 23 and the pad electrodes 25 are formed (shown in FIGS. 10A through 10C). Thereafter, the protection film 27 is formed on the surface of the insulating film 21. In the protection film 27 on the pad electrodes 25, an opening (not shown) is formed.

(2) According to a photoengraving method or an etching method, a region of the thermal oxide film 69 where the flexible parts 73 and the weight 75 are to be formed is selectively removed except for at least a region where the supporting part 11 is to be formed (shown in FIG. 11B).

(3) According to the photoengraving method, on the other side 3b of the SOI substrate 3, a resist pattern 77 is formed having an opening in a region where the flexible parts 73 are to be formed. The resist pattern 77 covers the region where the supporting part 11 and the weight 75 are to be formed. According to the etching method, the resist pattern 77 is masked so as to selectively remove a region of the second semiconductor layer 5 where the flexible parts 73 are to be formed (shown in FIG. 11C).

(4) After the resist pattern 77 is removed, the region of the second semiconductor layer 5 where the weight 75 is to be formed is etched from the other side 3b of the SOI substrate 3. Thus, the thickness is reduced of the region of the second semiconductor layer 5 where the weight 75 is to be formed so as to form the weight 75. A resist pattern (not shown) is formed on the other side 3b of the SOI substrate 3 for delimiting a region where the flexible parts 73 and the weight 75 are to be formed. The insulating layer 7, the semiconductor layer 9, the insulating film 21, and the protection film 27 are removed according to the etching method except for the region where the flexible parts 73 and the weight 75 are to be formed, which region is surrounded by the region where the supporting part 11 is to be formed. Thus, the flexible parts 73 and the weight 75 are formed (shown in FIGS. 10A through 10D and 11D).

(5) The thermal oxide film 69 is removed. At this time, the region of the insulating layer 7 where the flexible parts 73 are to be formed is removed simultaneously so as to form flexible parts 13 comprising the semiconductor layer 9 (shown in FIG. 11E).

(6) By the anodic bonding, a regulating board 29 is bonded onto a surface of the second semiconductor layer 5 of the other side 3b of the SOI substrate 3 including the region where the supporting part 11 is to be formed (shown in FIG. 11F).

(7) Thereafter, the semiconductor sensor 1 is cut out of the SOI substrate 3. Accordingly, the manufacturing steps of the semiconductor sensor 1 are completed (shown in FIGS. 10A through 10D).

Here, the semiconductor sensor 71 is formed by utilizing the SOI substrate 3 as the semiconductor substrate, but the semiconductor sensor may be formed by utilizing a semiconductor substrate comprising only a normal semiconductor.

In a conventional method of manufacturing the semiconductor sensor, a weight and flexible parts are formed from a semiconductor substrate. Hence, there is a problem in that the flexible part is fractured by inertia of the weight according to mechanical oscillation after the weight and the flexible parts are formed or water pressure caused by a washing operation.

SUMMARY OF THE INVENTION

It is a general object of the present invention to provide a semiconductor sensor that substantially obviates one or more problems caused by the limitations and disadvantages of the related art.

It is another and more specific object of the present invention to provide a semiconductor sensor and a manufacturing method of the same in which a fracture of a flexible part is prevented in the manufacturing method of the semiconductor sensor.

To achieve these and other advantages in accordance with the purpose of the invention, a preferred embodiment of the invention provides a semiconductor sensor that includes a substrate including at least a semiconductor layer. The substrate includes a weight arranging part in the vicinity of the center of the substrate, flexible parts around the weight arranging part, and a supporting part provided around the flexible parts. The semiconductor sensor further includes a weight arranged on the weight arranging part. The weight is made of a material different from that of the weight arranging part and the flexible part.

According to at least one embodiment of the present invention, a method of manufacturing a semiconductor sensor is disclosed that includes the steps of removing a predetermined portion of a semiconductor substrate selectively except for at least a region where a supporting part is to be formed so as to form a weight arranging part and flexible parts, and forming a weight on a surface of the semiconductor substrate at the weight arranging part.

According to an aspect of the present invention, the weight and the flexible part may be made in a different step. Therefore, the flexible part is prevented from having a defect caused by mechanical oscillation during a period from when the flexible part is formed to when the weight is formed or water pressure according to a washing operation. Hence, in the manufacturing step of the semiconductor sensor, the flexible part is protected from damage.

BRIEF DESCRIPTION OF THE DRAWINGS

Other objects and further features of the present invention become apparent from the following detailed description when read in conjunction with the accompanying drawings, in which.

DESCRIPTION OF THE PREFERRED EMBODIMENTS

In the following, embodiments of the present invention are described with reference to the accompanying drawings.

Figure 1A:
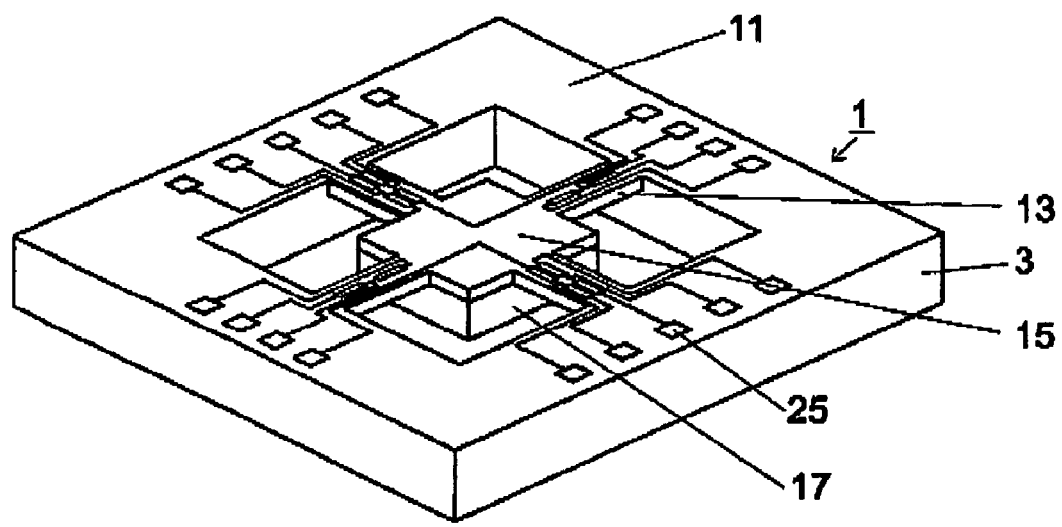
FIGS. 1A through 1D are schematic views illustrating a semiconductor sensor according to a first embodiment of the present invention.
Figure 1B:
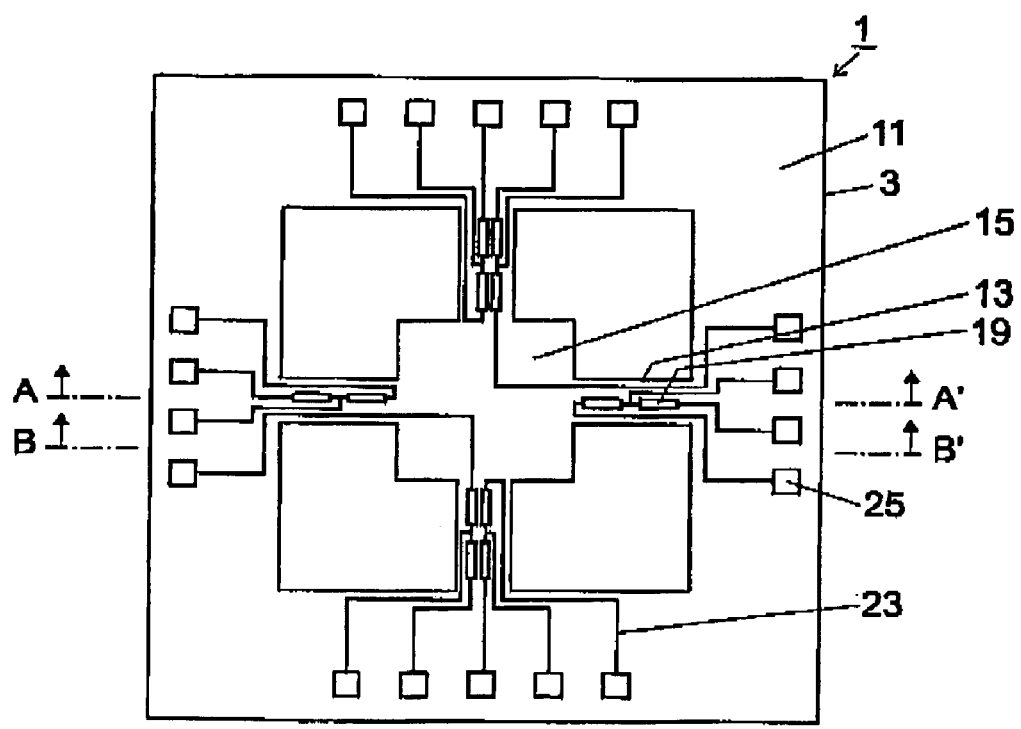
Figure 1C:
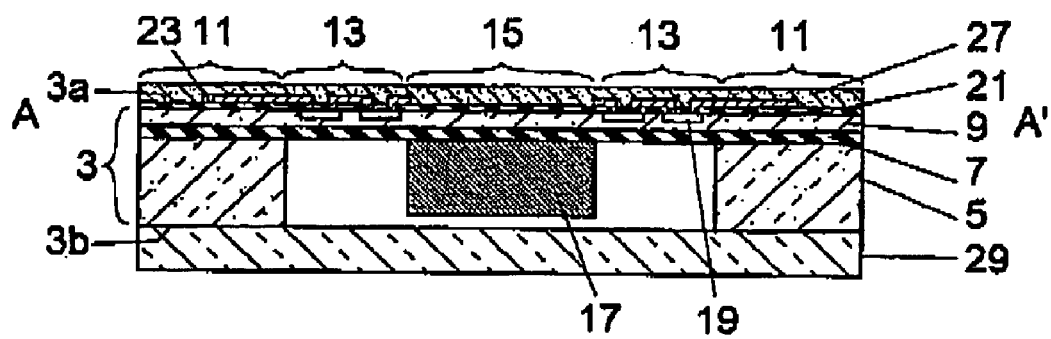
Figure 1D:
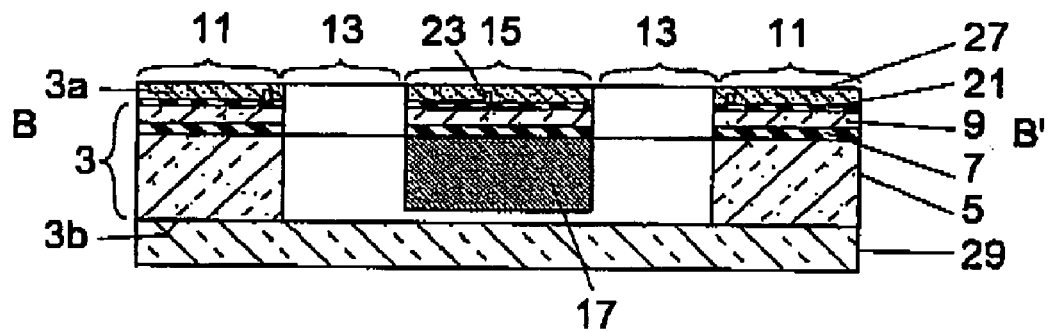

FIGS. 1A through 1D are schematic views illustrating a semiconductor sensor according to a first embodiment of the present invention, FIG. 1A is a cross-sectional view, FIG. 1B is a plan view, FIG. 1C is a cross-sectional view taken along a line A-A' shown in FIG. 1B, and FIG. 1D is a cross-sectional view taken along a line B-B' shown in FIG. 1B. With reference to FIGS. 1A through 1D, a description is given of the first embodiment of the present invention.

A semiconductor sensor 1 according to the present embodiment comprises, for example, an SOI substrate 3 having a size of 2.0 mm×2.5 mm in width and length, and 400 µm in thickness. The SOI substrate 3 is manufactured by, for example, laminating a second semiconductor layer 5 comprising a silicon having a thickness of 380 µm, an insulating layer 7 comprising silicon oxide having a thickness of 2 µm, and a semiconductor layer 9 comprising a silicon having a thickness of 10 µm.

Four flexible parts 13 comprising the insulating layer 7 and the semiconductor layer 9 are formed on the surface 3a of the SOI substrate 3, which flexible parts 13 are linked with the frame-shaped supporting part 11 comprising the SOI substrate 3. For example, the flexible part 13 has a length equal to 0.4 mm, and a width equal to 0.09 mm. In the semiconductor layer 9 of the flexible part 13, a piezoresistor 19 is formed.

In the vicinity of the center of the semiconductor sensor 1 around the supporting part 11, a weight arranging part 15 comprising the insulating layer 7 and the semiconductor layer 9 is formed, which weight arranging part 15 is linked with the flexible parts 13. In the weight arranging part 15, on a surface of the insulating layer 7 opposite to a side on which the semiconductor layer 9 is formed, a weight 17 is formed. The weight arranging part 15 and the weight 17 are square-shaped and have a size equal to 0.9 mm in each length and width. The height (thickness) of the weight 17 is equal to 370 µm. The weight 17 is arranged apart from the supporting part 11. The weight 17 is made of a metal paste (here, silver paste) having a relative density greater than that of the semiconductor layer 9 and the insulating layer 7. Accordingly, a piezoresistance type 3-axis semiconductor acceleration sensor is formed.

On the surface 3a of the SOI substrate 3, for example, an insulating film 21 having a thickness of 0.8 µm is formed. As for the insulating film 21, an NSG (non-doped silicon glass) film, a BPSG (Borophospho silicate grass) film, a PSG (phospho silicate glass) film or the like may be used.

On the insulating film 21, for example, plural metal wiring patterns 23 made of aluminum having a thickness of 1.0 µm and plural pad electrodes 25 are formed. For example, the width of the metal wiring patterns 23 is equal to 1.4 µm, and the pitch therebetween is equal to 1.5 µm. Each of the pad electrodes 25 has a size in square of 70 mm×70 mm. The pad electrodes 25 are provided on the supporting part 11. The metal wiring patterns 23 are electrically connected to the corresponding piezoresistors 19 via through-holes formed in the insulating film 21. In FIGS. 1A and 1B, the piezoresistors 19 are shown for the sake of convenience.

On the insulating film 21 including the region where the metal wiring patterns 23 are formed, a protection film 27 comprising an insulating film is formed. As for the protection film 27, for example, a passivation film may be used in which a silicon nitride film as an upper film is laminated on a silicon oxide film as a lower film. An opening is formed in the protection film 27 on the pad electrodes 25. In FIGS. 1A and 1B, the protection film 27 is not shown.

By the anodic bonding, the glass substrate 29 as a regulating board for regulating the range of movement of the weight 17 is bonded onto a surface of the second semiconductor layer 5 of the supporting part 11 on the other side 3b of the SOI substrate 3. An interval between the weight 17 and the glass substrate 29 is, for example, equal to 10 µm.

FIGS. 2A through 2F are cross-sectional views illustrating steps of the manufacturing method of the semiconductor sensor shown in FIGS. 1A through 1D. FIGS. 2A through 2F correspond to a position of the line A-A' shown in FIG. 1B. FIG. 3 is a view illustrating a manufacturing device of the semiconductor sensor to be used in the present embodiment. First, the manufacturing device of the semiconductor sensor is described with reference to FIG. 3.

A substrate holding part 31 is provided for holding the SOI substrate 3 from the surface 3a thereof, in which the piezoresistors 19 are formed. In the substrate holding part 31, on the surface holding the SOI substrate 3, a small opening (not shown) is formed for vacuum suction. The opening is connected to an exhauster (not shown) via a vacuum path. Accordingly, the substrate holding part 31 is configured to vacuum (take suction on) and hold the SOI substrate 3. The substrate holding part 31 includes a heater 33 for heating the SOI substrate 3 and a temperature sensor 35 for measuring the temperature of the substrate holding part 31.

A stage unit 37 is provided for positioning the substrate holding part 31. The stage unit 37 moves the substrate holding part 31 in the horizontal and vertical directions and rotates the SOI substrate in a horizontal plane according to a drive unit (not shown) such as a motor.

On the upper surface of the stage unit 37, an exhaust head 39 for squirting liquid material for forming the weight 17 and an image information camera 61 for obtaining image information of the SOI substrate 3.

Figure 3:
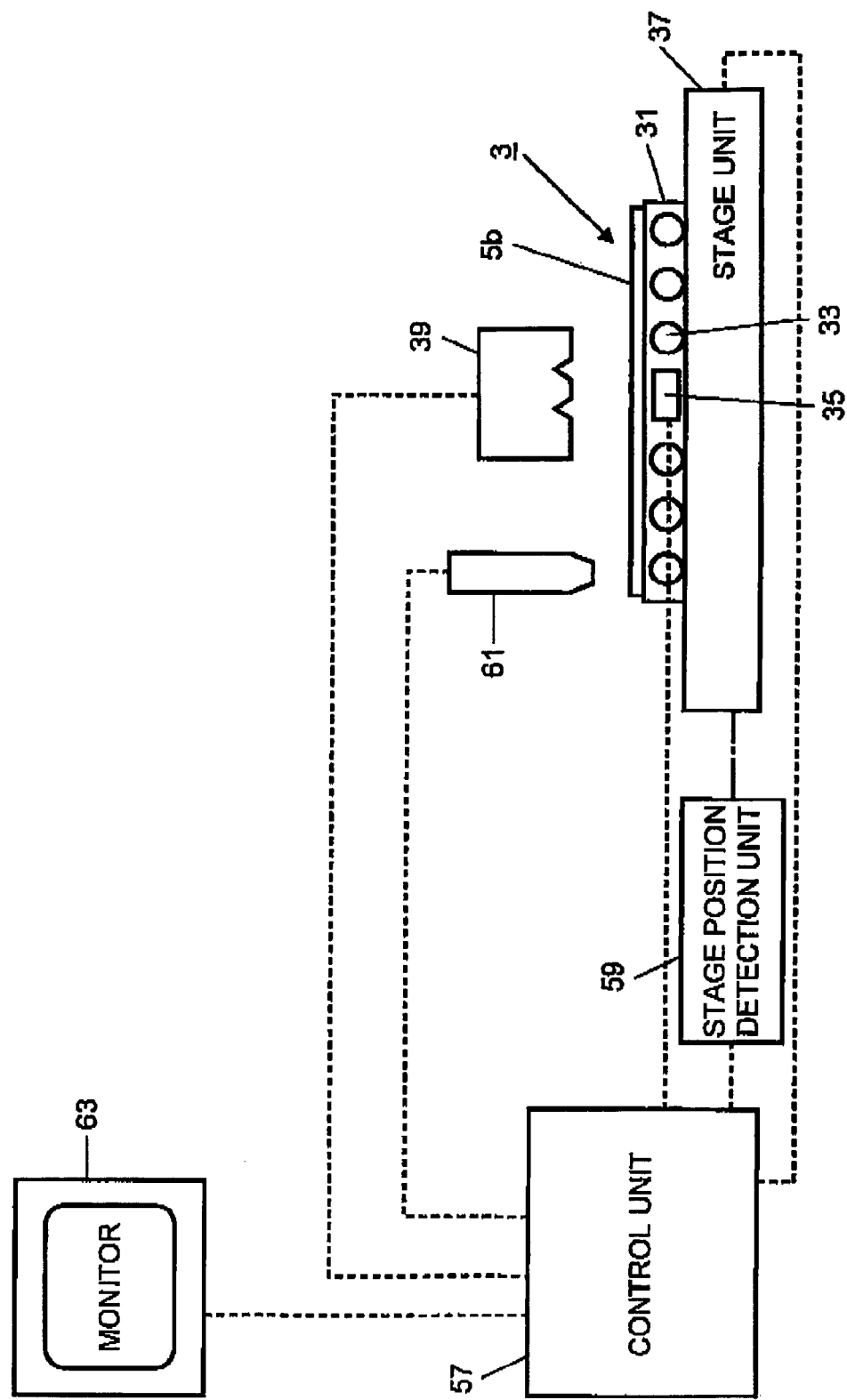
FIG. 3 is a view illustrating a manufacturing device of the semiconductor sensor to be used in the present embodiment.
Figure 4A:
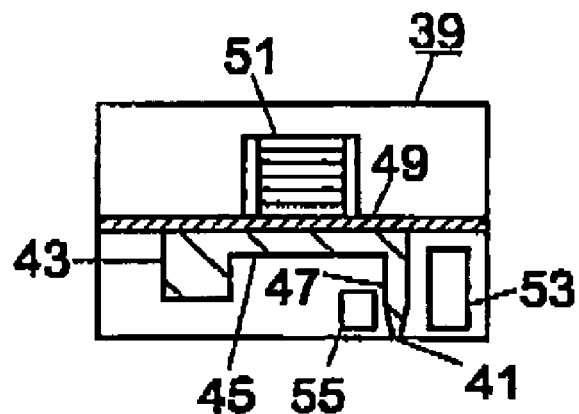
FIG. 4A is a schematic view illustrating the exhaust head of the manufacturing device of the semiconductor sensor, which exhaust head is in a waiting state.
Figure 4B:
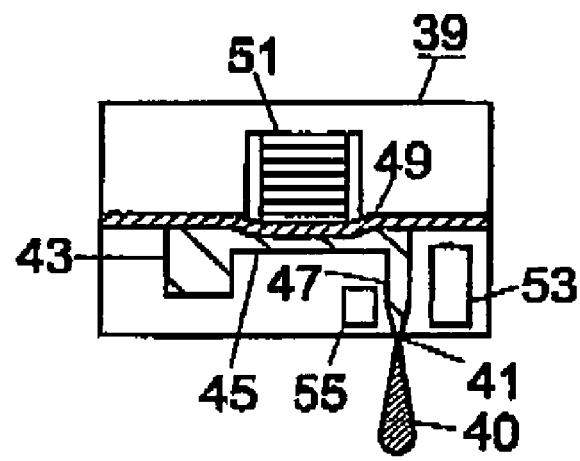
FIG. 4B is a schematic view illustrating the exhaust head in a squirting state.

FIG. 4A is a schematic view illustrating the exhaust head in a waiting state. FIG. 4B is a schematic view illustrating the exhaust head in a squirting state. On the surface of the exhaust head 39 opposing the SOI substrate 3, plural exhaust nozzles 41 are arranged in a line or in an array. In FIG. 3, only two exhaust nozzles are shown. In FIGS. 4A and 4B, only one exhaust nozzle is shown. In each of the exhaust nozzles 41, a liquid storing part 43 is provided for storing the liquid material for the weight 17.

Each of the liquid storing parts 43 is connected to the exhaust nozzle 41 via a liquid supply path 45 and an exhaust container 47. A part of a side of the liquid supply path 45 comprises a flexible thin film 49. On the side of the thin film 49 opposite to the liquid supply path 45, a piezo element 51 is provided. The exhaust head 39 includes a heater 53 for heating the liquid material for the weight 17, and a temperature sensor 55 for measuring the temperature of the liquid material for the weight 17.

A description is given of operations of the exhaust head 39. The exhaust head 39 squirts a droplet 40a of the liquid material for the weight 17 by utilizing pressure generated when the piezo element 51 is deformed. For example, when an electric voltage is applied to the piezo element 51, the piezo element 51 extends so as to press the liquid supply path 45. According to the pressure, a predetermined amount of the liquid material for the weight 17 is squirted as the droplets 40a from the exhaust nozzle 41 (shown in FIG. 4B).

As the piezo element 51 returns to its original state, the liquid material for the weight 17 is vacuumed from the liquid storing part 43 to the liquid supply path 45 (shown in FIG. 4A). The volume of the droplets of the liquid material for the weight 17 to be squirted from the exhaust head 39 is, for example, substantially equal to 0.05 nl (nanoliters). The exhaust head 39 according to the present embodiment has a structure similar to that of a piezo printer head used for an inkjet printer.

Returning to FIG. 3, a control unit 57 electrically connected to the stage unit 37 and the exhaust head 39 is provided for controlling the operations of the stage unit 37 and the exhaust head 39. In the vicinity of the stage unit 37, a stage position detection unit 59 is provided for obtaining positional information of the stage unit 37. The control unit 57 is also electrically connected to the temperature sensor 35, the image information camera 61, and the stage position detection unit 59. The temperature information of the temperature sensors 35 and 55, the image information of the image information camera 61, and the stage positional information of the stage position detection unit 59 are supplied to the control unit 57. The control unit 57 is further electrically connected to a monitor 63 for displaying setting information.

A description is given of the manufacturing method of the semiconductor sensor according to the first embodiment with reference to FIGS. 1A through 1D, 2A through 2F and 3. In FIGS. 2A through 2F, as for the manufacturing device of the semiconductor sensor, only the exhaust nozzle 39 is shown, and drawings of the other parts are omitted. In the present embodiment, as the liquid material for the weight 17, metal paste, i.e., silver paste (Fine Sphere®, a product of Nippon Paint Co., LTD, solid contents: 50 wt %, relative density: 10, and viscosity: 20 Pa·s) in which silver particles having size of 2 through 3 nm (nanometers) are dissolved into a solvent (tetradecane) is used.

Figure 2A:
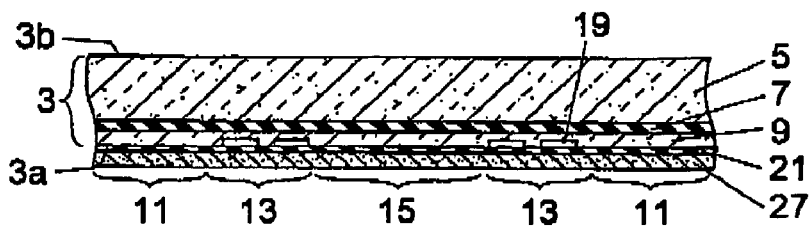
FIGS. 2A through 2F are cross-sectional views illustrating steps of a manufacturing method of the semiconductor sensor according to the first embodiment of the present invention.

(1) Referring to FIG. 2A, the piezoresistors 19 are formed in the semiconductor layer 9 in a region where the flexible parts 13 are to be formed in the SOI substrate 3 comprising the second semiconductor layer 5, the insulating layer 7, and the semiconductor layer 9. On the surface 3a of the semiconductor layer 9, the insulating film 21 is provided so as to cover the piezoresistors 19. After through holes are provided in a certain region of the insulating film 21, the metal wiring patterns 23 and the pad electrodes 25 (shown in FIGS. 1A through 1D)

are provided on the insulating film 21. The protection film 27 is provided on the insulating film 21 including the region where the metal wiring patterns 23 and the pad electrodes 25 are formed. In the protection film 27 on the pad electrode 25, an opening (not shown) is formed.

(2) According to a photoengraving method, a resist pattern 30 having a thickness of 10 μm is provided on the other side 3b of the SOI substrate 3. The resist pattern 30 covers a region where the supporting part 11 is to be formed and has an opening in a region where the flexible parts 13 and the weight arranging part 15 are to be formed. According to an etching method, the resist pattern 30 is masked so as to selectively remove a region of the second semiconductor layer 5 including the region where the flexible parts 13 and the weight arranging part 15 are to be formed. The region of the second resin layer 5 is surrounded by the region where the supporting part 11 is to be formed (shown in FIG. 2B).

(3) After the resist pattern 30 is removed, another resist pattern (not shown) is provided on the other surface 3b of the SOI substrate 3 for delimiting the region where the flexible parts 13 and the weight arranging part 15 are to be formed. Then, the insulating layer 7, the semiconductor layer 9, the insulating film 21 and the protection film 27 are removed according to the etching method except for the region where the flexible parts 13 and the weight arranging part 15 are to be formed, which region is surrounded by the region where the supporting part 11 is to be formed so as to form the flexible parts 13 and the weight arranging part 15 (shown in FIGS. 1A through 1D and 2C).

Here, the etching is performed from the other surface 3b of the SOI substrate 3 so as to form the flexible parts 13 and the weight arranging part 15, but it is not limited to this. Etching may be performed from the surface 3a of the SOI substrate 3.

(4) The SOI substrate 3 which is inverted so that the other surface 3b thereof faces upward is arranged on the substrate holding part 31 of the manufacturing device described with reference to FIGS. 3 and 4. The substrate holding part 31 holds the SOI substrate 3 by vacuuming the protection film 27.

The control unit 57 described with reference to FIGS. 3 and 4 controls heating of the heater 53 in accordance with the temperature information from the temperature sensor 55 so as to control the temperature of the liquid material for the weight 17, i.e., the silver paste in the liquid storing container 43, the liquid supply path 45, and the exhaust container 47 in the exhaust head 39. The control unit 57 also controls heating of the heater 33 in accordance with the temperature information from the temperature sensor 35 so as to control the temperature of the SOI substrate 3.

The control unit 57 moves the stage unit 37 in accordance with the image information from the image information camera 61 so as to position the SOI substrate 3 held on the substrate holding part 31. The control unit 57, in accordance with the image information of the semiconductor SOI substrate 3 from the image information camera 61, determines a position of the weight arranging part 15 of the SOI substrate 3 where the droplets 40a of the silver paste are to be attached.

With reference to the stage position information from the stage position detection unit 59, the control unit 57 supplies a driving signal to the stage unit 37 and the exhaust head 39 so as to position the substrate holding part 31 sequentially, which substrate holding part 31 vacuums and holds the SOI substrate 3. In addition, the droplets 40a are appropriately squirted so as to coat the weight arranging part 15 with the silver paste. Accordingly, the silver paste layer 42a is formed. Here, the silver paste is repeatedly applied while the temperature of the SOI substrate 3 is maintained substantially equal to 150° C. so that the silver paste layer 42a has a thickness of 370 μm on the insulating layer 7 (shown in FIG. 2D).

The silver paste is applied while the SOI substrate 3 is being heated so as to prevent dripping of the silver paste. Accordingly, it is possible to form a thick silver paste layer 42a.

The volume of the droplet 40a of the silver paste squirted from the exhaust head 39 is controlled to be a minimum, for example, 5 nl (nanoliters), with excellent precision. Accordingly, if the liquid material is needed to be delimited with excellent precision, the volume of the droplets 40a can be controlled corresponding to the excellent precision in a few nm (nanometers).

(5) The SOI substrate 3 is taken out of the manufacturing device and the solvent in the silver paste layer 42a is dried out by evaporation so as to harden the silver paste layer 42a. Accordingly, the weight 17 is formed (shown in FIG. 2E). For example, the SOI substrate 3 is put in a vacuum atmosphere so that organic substances contained in the silver paste are evaporated away.

Figure 2B:
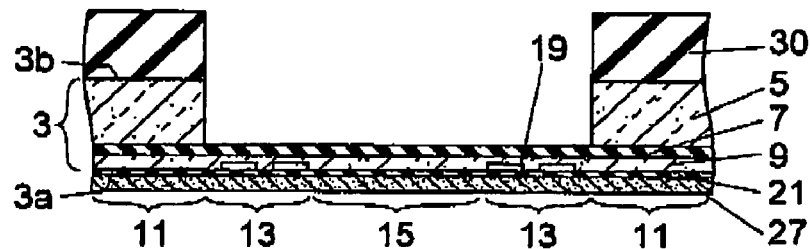
Figure 2C:
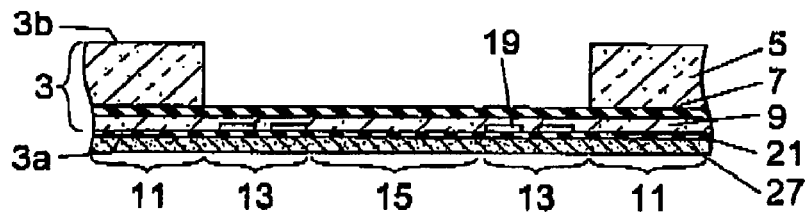
Figure 2D:
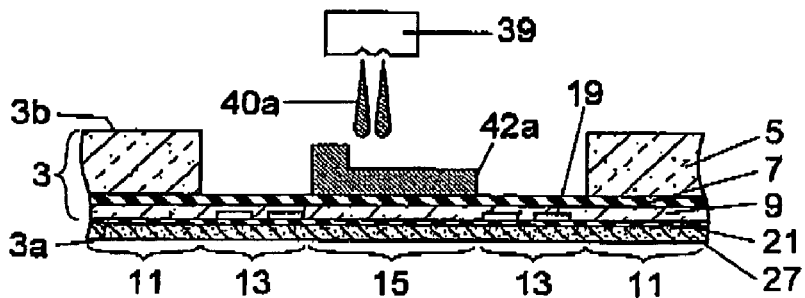
Figure 2E:
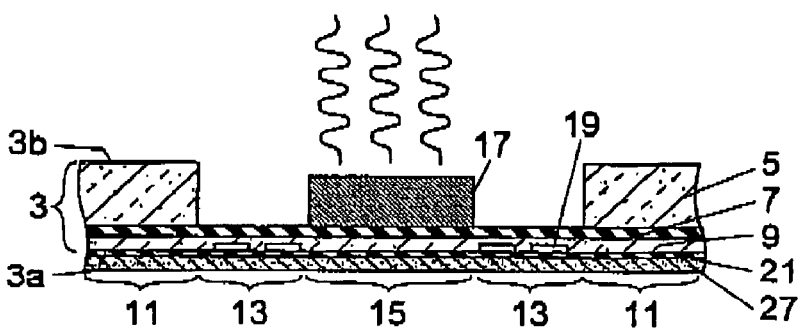
Figure 2F:
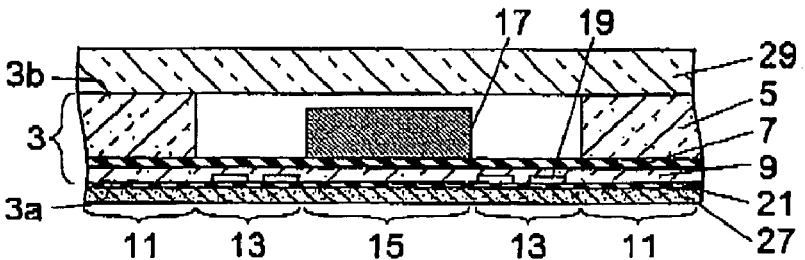

(6) According to the anodic bonding, the regulating board 29 is bonded onto the surface of the second semiconductor layer 5 including the region where the supporting board 11 is to be formed on the other side 3b of the SOI substrate 3 (shown in FIG. 2F).

(7) Thereafter, the semiconductor sensor 1 is cut out of the SOI substrate 3. Accordingly, the manufacturing steps of the semiconductor sensor 1 in which the weight 17 is made of the silver paste are completed (shown in FIGS. 1A through 1D).

In the semiconductor sensor according to the above described embodiment, the weight 17 is made of a silver paste which is different from the material of the weight arranging part 15 and the flexible part 13. The manufacturing method according to the above described embodiment includes a step of forming the piezoresistors 19, a step of selectively removing a predetermined region of the SOI substrate 3 from the other side 3b of the SOI substrate 3 so as to form the weight arranging part 15 and the flexible parts 13, and a step of forming the weight 17 on the other side 3b of the SOI substrate 3 in the weight arranging part 15. Accordingly, the weight 17 and the flexible parts 13 can be formed in different steps. Therefore, the flexible parts 13 are prevented from having a defect caused by mechanical oscillation during a time from when the flexible parts 13 are formed to when the weight 17 is formed or water pressure caused by a washing operation. Hence, in the manufacturing steps of the semiconductor sensor 1, the flexible parts 13 are protected from damage.

Moreover, in the semiconductor sensor according to the above described embodiment, the weight 17 is made of metal (here, the silver paste) having a relative density greater than the relative density of the material constituting the weight arranging part 15 and the flexible parts 13 (here, the semiconductor layer 9 and the insulating layer 7). In the manufacturing method according to the above described embodiment, the silver paste is used as the liquid material for the weight 17. Hence, in comparison to the weight 75 of the conventional semiconductor sensor 71 (shown in FIGS. 10A through 10D) in which the weight 75 is made of the same material as the flexible parts 73 and the supporting part 11, the weight 17 maintains the same weight as the weight 75 so as to maintain the sensitivity of the sensor while the volume of the weight 17 is reduced. Accordingly, the surface area of the weight 17 is reduced so that the area of the semiconductor sensor 1 can be reduced. Further, if the weight 17 having the same volume as the weight 75 of the conventional semiconductor sensor 71 is mounted on the semiconductor sensor 1, the weight (gravity effect) of the weight 17 in the semiconductor sensor 1 can be increased. Hence, the sensitivity of the sensor can be improved.

Furthermore, according to the present embodiment, the semiconductor sensor 1 is obtained by processing the SOI substrate 3. In the manufacturing method of the present embodiment, the SOI substrate 3 is used as the semiconductor substrate. According to the etching, the region of the second semiconductor layer 5 where the weight arranging part 15 and the flexible parts 13 are formed is removed by using the insulating layer 7 as the etching stopper layer. Accordingly, when the region of the second semiconductor layer 5 where the flexible parts 13 and the weight arranging part 15 are formed is removed by etching, it is possible to control the depth to be etched easily. Hence, the accuracy of the film thickness of the flexible parts 13 can be improved. Hence, the sensitivity of the semiconductor sensor 1 can be improved.

Figure 5A:
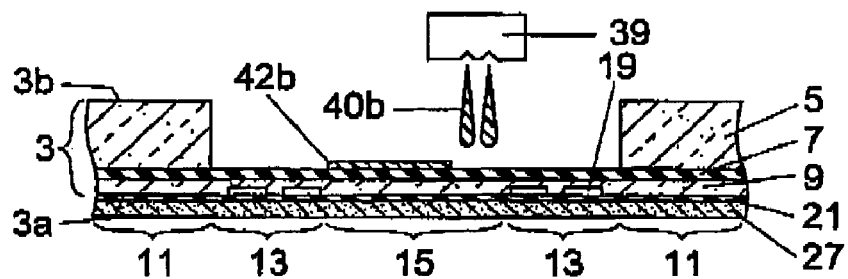
FIGS. 5A through 5E are cross-sectional views illustrating steps of a manufacturing method of a semiconductor sensor according to a second embodiment.
Figure 5B:
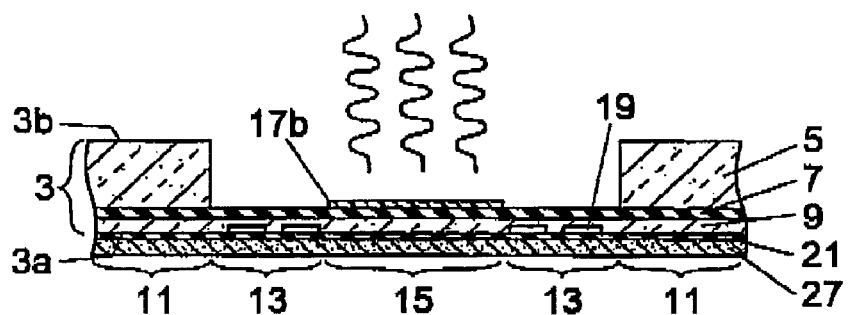
Figure 5C:
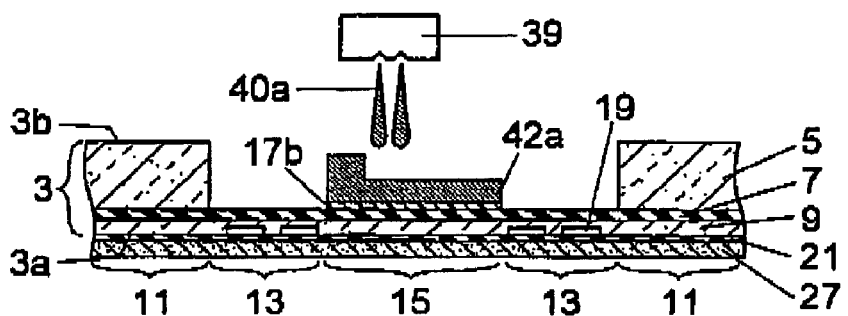
Figure 5D:
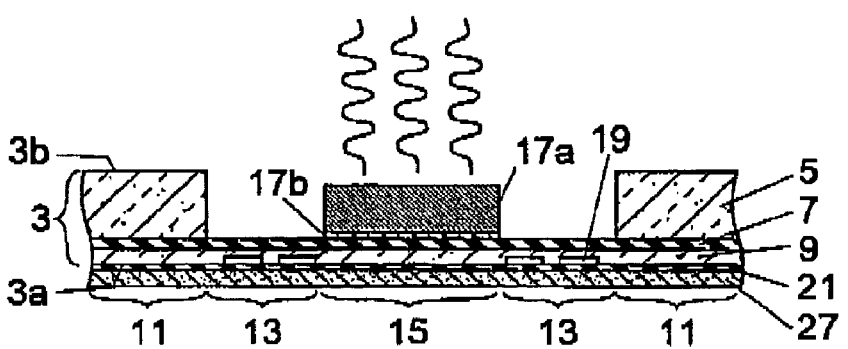
Figure 5E:
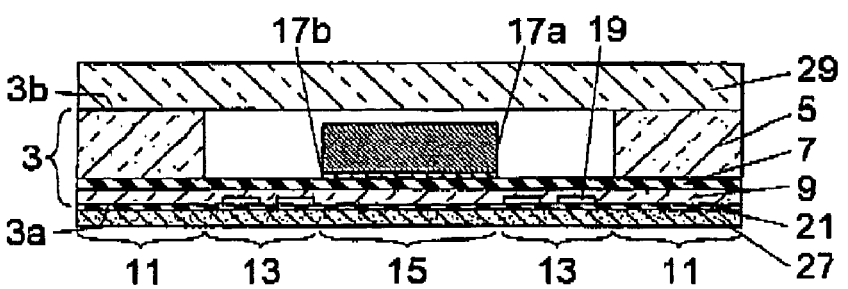

FIGS. 5A through 5D are cross-sectional views illustrating steps of the manufacturing method of the semiconductor sensor according to a second embodiment. FIG. 5E is a cross-sectional view of the semiconductor sensor according to the second embodiment. In FIGS. 5A through 5E, the same components as shown in FIGS. 1A through 1D and 2A through 2F are given the same reference numerals. First, a description is given of a semiconductor sensor according to the present embodiment with reference to FIG. 5E.

The second embodiment differs from the first embodiment that is described with reference to FIGS. 1A through 1D in that the weight 17 comprises a second resin part 17b provided on the weight arranging part 15 and a metal part 17a provided on the second resin part 17b. For example, the second resin part 17b is formed by hardening liquid epoxy resin. The metal part 17a is made of the silver paste. The second resin part 17b functions as an adhesion improving layer for improving adhesion between the weight arranging part 15 and the metal part 17a. The thickness of the second resin part 17b is, for example, equal to 1 μm.

A description is given of a manufacturing method of the semiconductor sensor according to the second embodiment with reference to FIGS. 5A through 5E.

In FIGS. 5A through 5E, in the same manner as FIGS. 2A through 2F, as for the manufacturing device of the semiconductor sensor, only the exhaust nozzle 39 is shown, while the drawing of the other parts is omitted. In the present embodiment, as the liquid material for the weight 17, the same silver paste as used in the first embodiment and liquid epoxy resin (CEL-C-3140, a product of the Hitachi Chemical Co., LTD, viscosity: 0.6 Pa·s) as unhardened resin for the second resin part are used.

(1) In the same manner as the above steps (1) through (3) described with reference to FIGS. 2A, 2B and 2C, the piezoresistors 19, the insulating layer 21, and the protection film 27 are formed in the SOI substrate 3. On the surface 3a of the SOI substrate 3, the flexible parts 13 and the weight arranging part 15 are formed.

With the exhaust head 39 in which unhardened liquid epoxy resin is supplied, in the same manner as the above step (4) described with reference to FIG. 2D, droplets 40b of the liquid epoxy resin are squirted from the exhaust head 39 appropriately so as to form an epoxy resin layer (second unhardened resin layer) 42b on the weight arranging part 15. Here, the liquid epoxy resin is repeatedly applied while the temperature of the SOI substrate 3 is controlled to be 120° C. so as to form the epoxy resin layer 42b having a thickness of 1 μm on the weight arranging part 15.

(2) The SOI substrate 3 is heated to 150° C. and maintained at that temperature for 30 minutes so as to harden the epoxy resin layer 42b. Accordingly, the second resin part 17b is formed (shown in FIG. 5B).

(3) With the exhaust head 39 in which the silver paste is supplied, in the same manner as the above step (4) described with reference to FIG. 2D, the droplets 40a of the silver paste are squirted from the exhaust head 39 appropriately so as to form a sliver paste layer 42a on the second resin part 17b. Here, for example, the silver paste is repeatedly applied while the temperature of the SOI substrate 3 is 150° C. so as to form the silver paste layer 42a having a thickness of 370 μm on the second resin part 17b (shown in FIG. 5C).

(4) In the same manner as the above step (5) described with reference to FIG. 2E, the solvent of the silver paste layer 42a is dried out by evaporation so as to harden the silver paste layer 42a. Accordingly, the metal part 17a is formed. As above described, the weight 17 is formed comprising the metal part 17a and the second resin part 17b (shown in FIG. 3D).

(5) By an anodic bonding, a regulating board 29 is bonded onto the surface of the second semiconductor layer 5 of the other side 3b of the SOI substrate 3 including the region where the supporting part 11 is formed. Thereafter, the semiconductor sensor 1 is cut out of the SOI substrate 3. Accordingly, the manufacturing steps are completed for the semiconductor sensor in which the weight 17 comprises the metal part 17a and the second resin part 17b (shown in FIG. 5E).

According to the present embodiment, the same effect can be obtained as with the first embodiment described with reference to FIGS. 1A through 2F.

Further, since the second resin layer 17b is provided for improving the adhesion between the weight arranging part 15 and the metal part 17a, the metal part 17a is prevented from separating from the weight arranging part 15.

Moreover, since the weight 17 comprises the second resin part 17b and the metal part 17a provided on the second resin part 17b, the center of gravity of the weight 17 can be arranged at a position far from the weight arranging part 15. Accordingly, the sensitivity of the sensor can be improved.

In the second embodiment described with reference to FIGS. 5A through 5E, a step in which the epoxy resin layer 42b as the second unhardened resin layer is hardened so as to form the second resin part 17b (shown in the above step (2) and FIGS. 5A through 5E) is performed separate from a step in which the silver paste layer 42a as the metal paste layer is hardened so as to form the metal part 17a (shown in the above process (4) and FIG. 5D), but it is not limited to this. The second unhardened resin layer and the metal paste layer may be hardened simultaneously so as to form the second resin part and the metal part, respectively.

FIGS. 6A through 6D are cross-sectional views illustrating steps of the manufacturing method of the semiconductor sensor according to a third embodiment of the present invention. In FIGS. 6A through 6D, the same components as shown in FIGS. 1A through 1D and 2A through 2F are given the same reference numerals. First, with reference to FIG. 6D, a description is given of the semiconductor sensor according to the present embodiment.

The third embodiment differs from the first embodiment described with reference to FIGS. 1A through 1D in that the weight 17 comprises the metal part 17a provided on the weight arranging part 15 and the resin part 17c provided on the weight arranging part 15 and the metal part 17a. For example, the resin part 17c is formed by hardening liquid epoxy resin. The resin part 17c covers the metal part 17a so as to prevent the metal part 17a from contacting the surrounding atmosphere.

A description is given of a method of manufacturing the semiconductor sensor according to the third embodiment with reference to FIGS. 6A through 6D.

In FIGS. 6A through 6D, in the same manner as FIGS. 2A through 2F, as for the manufacturing device of the semiconductor sensor, only the exhaust nozzle 39 is shown while the drawing of the other parts is omitted. In the present embodiment, as the liquid material for the weight, the same silver paste as the first embodiment described with reference to FIGS. 2A through 2F, and liquid epoxy resin (CEL-C-3140, a product of Hitachi Chemical Co., LTD, viscosity: 0.6 Pa·s) as an unhardened resin are used.

(1) In the same manner as the steps (1) through (3) described with reference to FIGS. 2A, 2B, and 2C, the piezoresistance 19, the insulating film 21, the protection film 27 are formed in the SOI substrate 3. On the surface 3a of the SOI substrate 3, the flexible parts 13 and the weight arranging part 15 are formed.

With the exhaust head 39 in which the silver paste is supplied, in the same manner as the above step (4) described with reference to FIG. 2D, the droplets 40a of the silver paste are squirted from the exhaust head 39 appropriately so as to form a sliver paste layer 42a at a center of the weight arranging part 15, which silver paste layer 42a has an area slightly smaller than that of the weight arranging part 15. Here, for example, the silver paste is repeatedly applied so as to form the silver paste layer 42a having a thickness of 40 μm on the weight arranging part 15 (shown in FIG. 6A).

(2) With the exhaust head 39 in which the liquid epoxy resin is supplied, in the same manner as the above step (4) described with reference to FIG. 2D, droplets 40c of the liquid epoxy resin are squirted from the exhaust head 39 appropriately. Thereby, an epoxy resin layer (unhardened resin layer) 42c is formed on the weight arranging part 15 and the silver paste layer 42a so as to cover the silver paste layer 42a. Here, for example, the liquid epoxy resin is repeatedly applied so as to form the epoxy resin layer 42c having a thickness of 330 μm on the silver paste layer 42a (shown in FIG. 6B).

(3) The solvent in the silver paste layer 42a and the epoxy resin layer 42c is dried out by evaporation so as to harden the silver paste layer 42a and the epoxy resin layer 42c. Accordingly, the metal part 17a and a resin part 17c are formed. As above described, the weight 17 is formed comprising the metal part 17a and the resin part 17c covering the metal part 17a (shown in FIG. 6C).

(4) By the anodic bonding, the regulating board 29 is bonded onto the surface of the second semiconductor layer 5 including the region where the supporting board 11 is formed on the other side 3b of the SOI substrate 3. Thereafter, the semiconductor sensor 1 is cut out of the SOI substrate 3. Accordingly, the manufacturing steps are completed of the semiconductor sensor 1 in which the weight 17 comprises the metal part 17a and the resin part 17c covering the metal part 17a (shown in FIG. 6D).

According to the present embodiment, the same effect can be obtained as with the first embodiment described with reference to FIGS. 1A through 2F.

Further, the weight 17 comprises the metal part 17a including the silver paste provided on the weight arranging part 15 and the resin part 17c including the epoxy resin provided on the metal part 17a. Since the resin part 17c is softer than the metal part 17a, the hard metal part 17a is prevented from colliding with the glass substrate 29 so as to protect the glass substrate 29 and the metal part 17a from damage.

Moreover, the resin part 17c covers the metal part 17a so as to prevent the metal part 17a from contacting the surrounding atmosphere. Accordingly, the metal part 17a of the weight 17 is prevented from contacting the surrounding atmosphere of the weight 17 so as to be protected from corrosion due to moisture. Hence, degradation of the semiconductor sensor can be prevented.

In the third embodiment shown in FIGS. 6A through 6D, the metal part 17a and the resin part 17c contact the weight arranging part 15 directly, but the second resin part may be formed as an adhesion improving layer between the weight arranging part 15 and the layer constituted of the metal part 17a and the resin part 17c. In this case, it is desirable that the second resin part be formed as the adhesion improving layer at least between the metal part 17a and the weight arranging part 15.

Figure 6A:
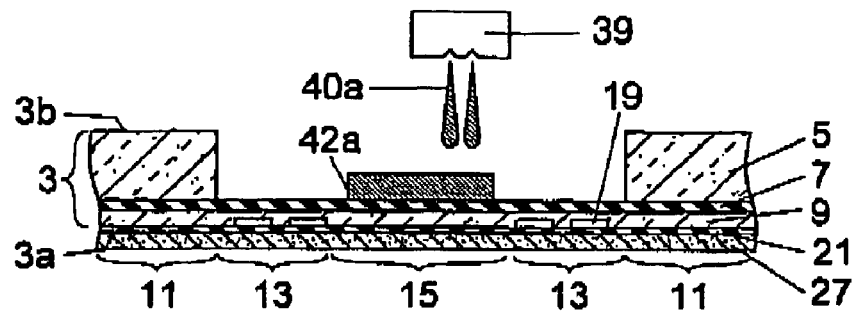
FIGS. 6A through 6D are cross-sectional views illustrating steps of a manufacturing method of a semiconductor sensor according to a third embodiment of the present invention.
Figure 6B:
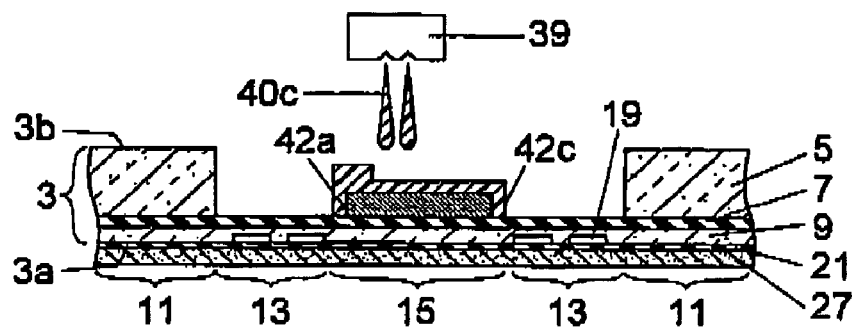
Figure 6C:
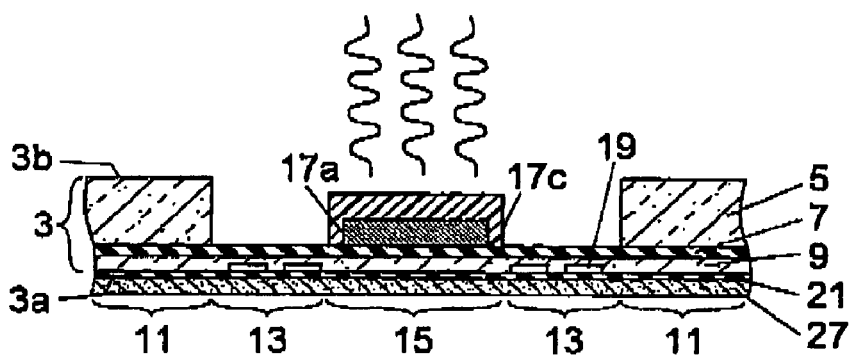
Figure 6D:
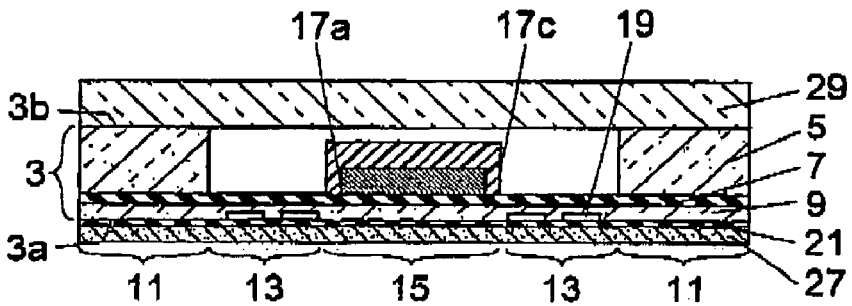

Further, in the third embodiment described with reference to FIGS. 6A through 6D, the silver paste layer 42a as the metal paste layer and the epoxy resin layer 42c as the unhardened resin layer are simultaneously hardened so as to form the metal part 17a and the resin part 17c, respectively (shown in the above step (3) and FIG. 6C), but it is not limited to this. After a metal paste layer is hardened to be a metal part, at least an unhardened resin layer is formed on the metal part. Thereafter, the unhardened resin layer is hardened so as to form a resin part.

FIGS. 7A through 7D are cross-sectional views illustrating steps of the manufacturing method of the semiconductor sensor according to a fourth embodiment of the present invention. In FIGS. 7A through 7D, the same components as shown in FIGS. 1A through 1D and 2A through 2F are given the same reference numerals. First, a description is given of the semiconductor sensor according to the present embodiment with reference to FIG. 7D.

The present embodiment differs from the first embodiment described with reference to FIGS. 1A through 1D in that the weight 17 comprises a second resin part 17d provided on the weight arranging part 15 and the metal part 17a provided on the second resin part 17d. For example, the second resin part 17d is formed by hardening liquid epoxy resin.

A description is given of the method of manufacturing the semiconductor sensor with reference to FIGS. 7A through 7D.

In FIGS. 7A through 7D, in the same manner as FIGS. 2A through 2F, as for the manufacturing device of the semiconductor sensor, only the exhaust nozzle 39 is shown while the drawing of the other parts is omitted. In the fourth embodiment, as the liquid material for the weight 17, the same silver paste as the first embodiment described with reference to FIGS. 2A through 2F, and liquid epoxy resin as second unhardened resin are used.

(1) In the same manner as the steps (1) through (3) described with reference to FIGS. 2A, 2B, and 2C, the piezoresistance 19, the insulating film 21, the protection film 27 are formed in the SOI substrate 3. On the surface 3a of the SOI substrate 3, the flexible parts 13 and the weight arranging part 15 are formed.

With the exhaust head 39 in which the liquid epoxy resin is supplied, in the same manner as the above step (4) described with reference to FIG. 2D, droplets 40d of the liquid epoxy resin are squirted from the exhaust head 39 appropriately so as to form an epoxy resin layer (second unhardened resin layer) 42d on the weight arranging part 15. Here, for example, the liquid epoxy resin is repeatedly applied so as to form the epoxy resin layer 42d having a thickness of 330 μm (shown in FIG. 7A).

(2) With the exhaust head 39 in which the silver paste is supplied, in the same manner as the above step (4) described with reference to FIG. 2D, the droplets 40a of the silver paste are squirted from the exhaust head 39 appropriately so as to form a silver paste layer 42a on the epoxy resin layer 42d. Here, for example, the silver paste is repeatedly applied so as to form the silver paste layer 42a having a thickness of 40 μm (shown in FIG. 7B).

(3) The solvent in the epoxy resin layer 42d and the silver paste layer 42a is dried out by evaporation so as to harden the epoxy resin layer 42d and the silver paste layer 42a. Accordingly, the metal part 17a and a second resin part 17d are formed. As above described, the weight 17 comprises the second resin part 17d and the metal part 17a (shown in FIG. 7C).

(4) By the anodic bonding, the regulating board 29 is bonded onto the surface of the second semiconductor layer 5 including the region where the supporting board 11 is formed on the other side 3b of the SOI substrate 3. Thereafter, the semiconductor sensor 1 is cut out of the SOI substrate 3. Accordingly, the manufacturing steps are completed of the semiconductor sensor 1 in which the weight 17 comprises the second resin part 17d and the metal part 17a (shown in FIG. 7D).

According to the present embodiment, the same effect can be obtained as with the first embodiment described with reference to FIGS. 1A through 2F.

Moreover, the weight 17 comprises the second resin part 17b and the metal part 17a provided on the second resin part 17b, the center of gravity of the weight 17 can be arranged at a position far from the weight arranging part 15. Accordingly, the sensitivity of the sensor can be improved.

Figure 7A:
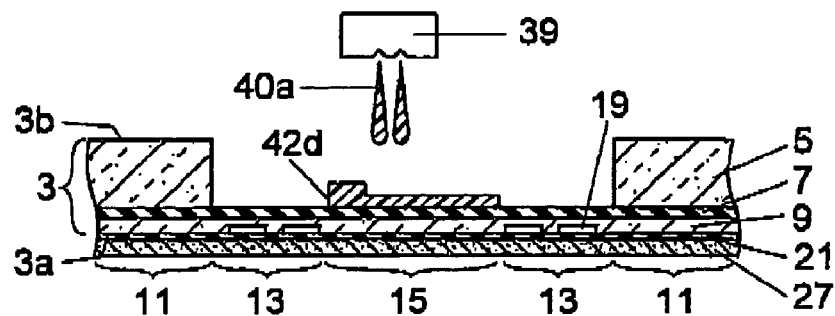
FIGS. 7A through 7D are cross-sectional views illustrating steps of a manufacturing method of a semiconductor sensor according to a fourth embodiment of the present invention.
Figure 7B:
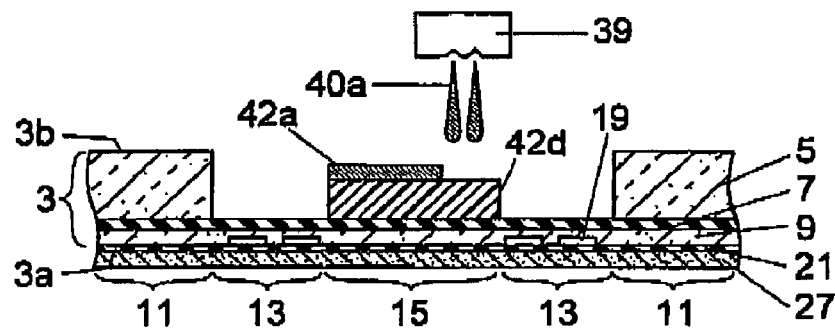
Figure 7C:
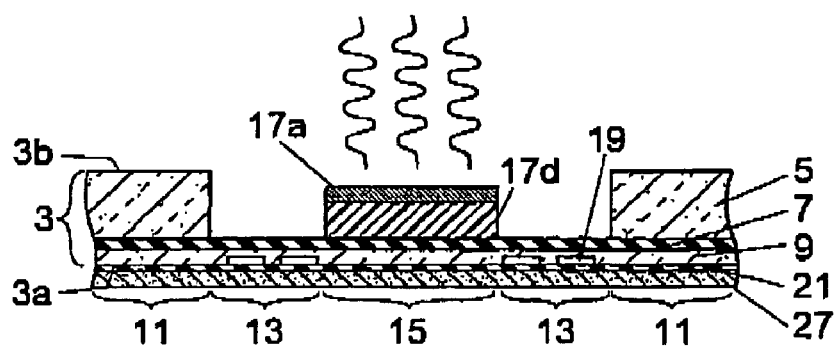

Further, in the fourth embodiment described with reference to FIGS. 7A through 7D, the silver paste layer 42a as the metal paste layer and the epoxy resin layer 42d as the second unhardened resin layer are simultaneously hardened so as to form the metal part 17a and the second resin part 17d, respectively (shown in the above step (3) and FIG. 7C), but it is not limited to this. After a second unhardened resin layer is hardened to be a second resin part, a metal paste layer is formed on the second resin part. Thereafter, the metal paste layer is hardened so as to form a metal part.

FIGS. 8A through 8F are cross-sectional views illustrating the semiconductor sensor according to an embodiment of the present invention. In FIGS. 8A through 8F, the components playing the same functions as shown in FIGS. 1A through 1D, and FIGS. 5A through 7D are given the same reference numerals. In the embodiment, the same effect can be obtained as with the first embodiment described with reference to FIGS. 1A through 2F.

Figure 8A:
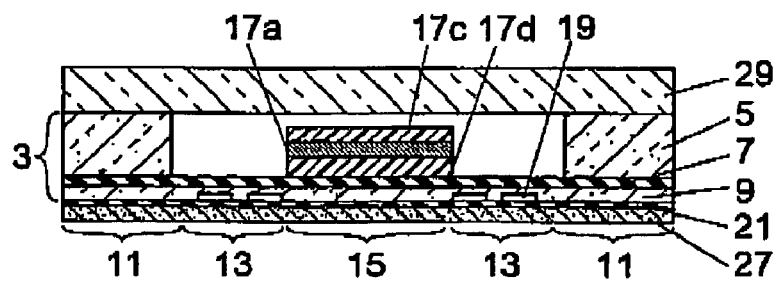
FIGS. 8A through 8F are cross-sectional views illustrating the semiconductor sensor according to an embodiment of the present invention.

In the embodiment shown in FIG. 8A, the weight 17 is formed by laminating the second resin part 17d, the metal part 17a, the resin part 17c sequentially from the weight arranging part 15.

In the present embodiment, since the second resin part 17b and the metal part 17a formed on the second resin part 17b are mounted, the center of gravity of the weight 17 can be arranged at a position far from the weight arranging part 15. Accordingly, the sensitivity of the sensor can be improved.

Further, since the weight comprises the metal part 17a formed on the weight arranging part 15 and the resin part 17c formed on the metal part 17a, the metal part 17a is prevented from colliding against the glass substrate 29 so as to protect the metal part 17a and the glass substrate 29 from damage.

Moreover, the resin part 17c and the second resin part 17d are made of the same material, here, epoxy resin. Accordingly, in the manufacturing method in which the exhaust nozzle is used according to the present invention, the same material can be used for the unhardened resin of the resin part 17c and the second unhardened resin of the second resin part 17d. Since the same exhaust nozzle can be used to drip the unhardened resin and the second unhardened resin, the number of nozzles to be used can be reduced.

Figure 8B:
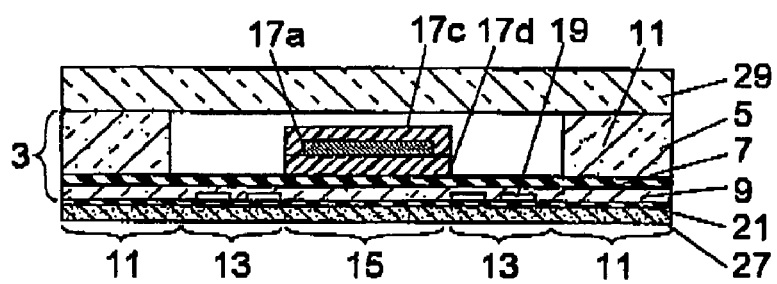

In the embodiment shown in FIG. 8B, in comparison to the embodiment shown in FIG. 8A, the resin part 17c covers the metal part 17a so as to prevent the metal part 17a from contacting the surrounding atmosphere. Accordingly, the metal part 17a of the weight 17 is prevented from contacting the surrounding atmosphere so as to protect the metal part 17a from corrosion due to moisture. Hence, degradation of the semiconductor sensor can be prevented.

Figure 8C:
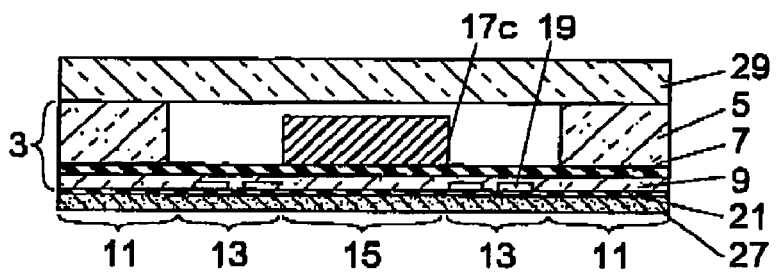

In the embodiment shown in FIG. 8C, the weight 17 comprises only the resin part 17c. Hence, when the volume of the weight according to the present embodiment is the same as the volume of the weight which is made of metal paste, the weight (gravity effect) of the semiconductor sensor can be reduced.

Figure 8D:
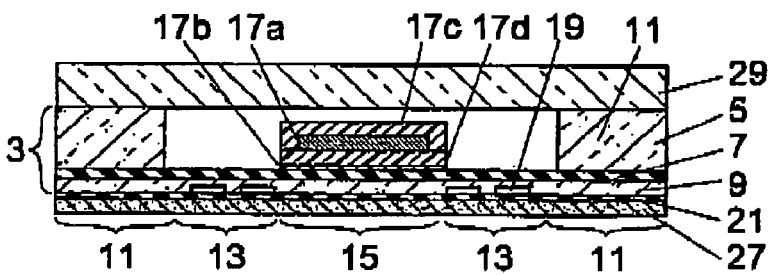

In the embodiment shown in FIG. 8D, in comparison to the embodiment shown in FIG. 8B, the second resin part 17d is provided on the weight arranging part 15 via the other second resin part 17b functioning as an adhesion improving layer. Accordingly, separating of the weight 17 can be prevented.

In the embodiments shown in FIGS. 8A through 8D, the semiconductor sensor can be manufactured in the same manner as the manufacturing methods described with reference to FIGS. 2A through 7D.

Figure 8E:
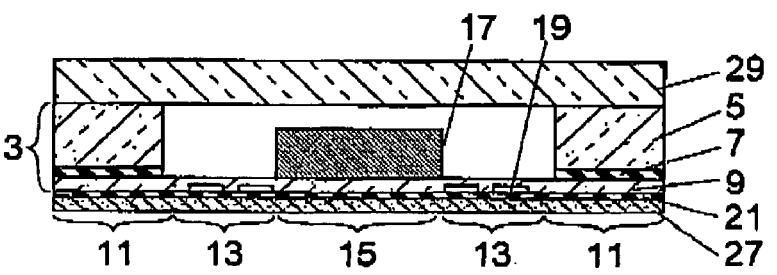

In the embodiment shown in FIG. 8E, a region of the insulating layer 7 where the flexible parts 13 and the weight arranging part 15 are formed is removed. The flexible parts 13 and the weight arranging part 15 comprises the semiconductor layer 9.

The configuration according to the present embodiment can be provided by adding a step of removing the region of the insulating layer 7 to the above step (2) or (3) of the first embodiment described with reference to FIGS. 2A through 2F.

Figure 8F:
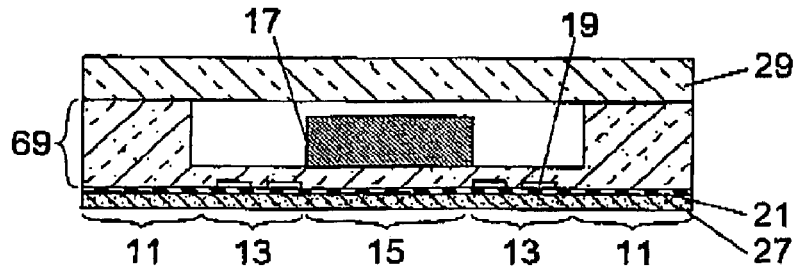

In the embodiment shown in FIG. 8F, instead of the SOI substrate, a silicon substrate 69 is used as a semiconductor substrate to be the base of the semiconductor sensor.

The configuration according to the present embodiment can be formed in the same manner as the manufacturing method of the first embodiment described with reference to FIGS. 2A through 2F by using the silicon substrate instead of the SOI substrate.

Moreover, the material for the weight 17 and the metal part 17a may include a magnetic metal such as iron, nickel, and the like. With the magnetic member, a sensitivity test of the semiconductor sensor can be carried out.

FIGS. 9A through 9D are cross-sectional views illustrating the semiconductor sensor according to an embodiment of the present invention. In FIGS. 9A through 9D, the components playing the same function as shown in FIGS. 1A through 1D and FIGS. 5A through 8F are given the same reference numerals. In the embodiment shown in FIGS. 9A through 9D, the same effect can be obtained as in the embodiments described with reference to FIGS. 1A through 2F.

Figure 7D:
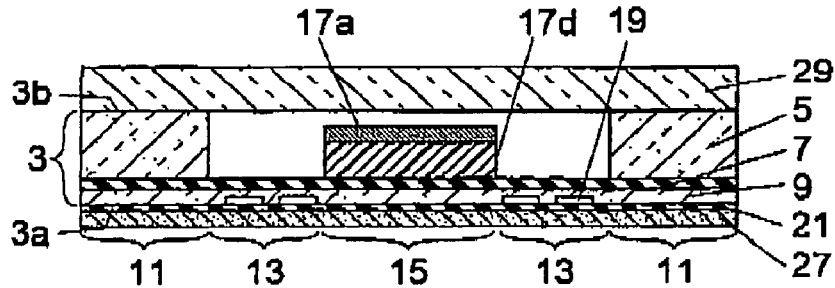
Figure 9A:
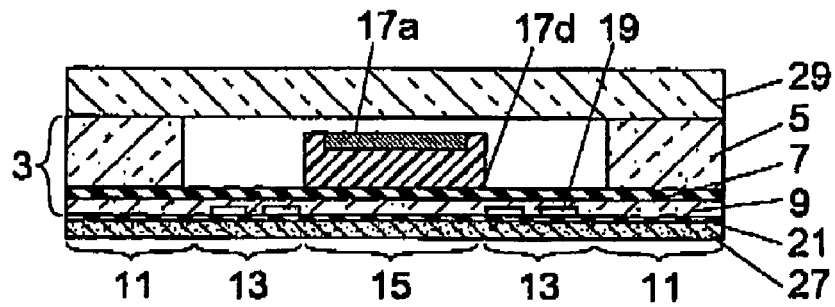
FIGS. 9A through 9D are cross-sectional views illustrating the semiconductor sensor according to an embodiment of the present invention.

In the embodiment shown in FIG. 9A, in comparison to the embodiment shown in FIG. 7D, a concave part is formed on the upper surface of the second resin part 17d, and the metal part 17a is provided in the concave part of the second resin part 17d.

The metal part 17a is provided in the concave part formed on the upper surface of the second resin part 17d. Hence, even if a fluid material is used for the metal part 17a upon forming the metal part 17a, the metal part 17a can be formed in a predetermined region since the region where the metal part 17a is to be formed is delimited by the concave part of the second resin part 17d.

Figure 9B:
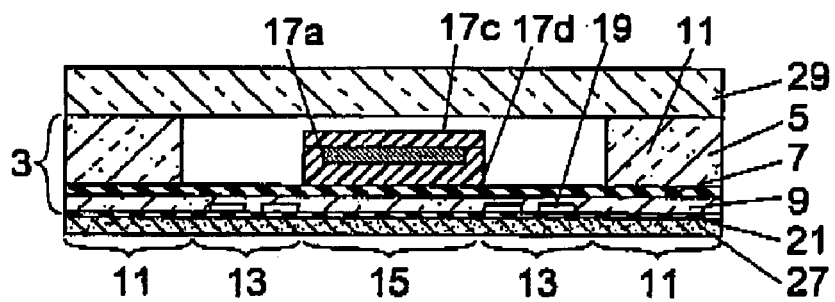

In the embodiment shown in FIG. 9B, in comparison to the embodiment shown in FIG. 9A, the resin part 17c is formed on the metal part 17a and the second resin part 17d. The metal part 17a is prevented from contacting the surrounding atmosphere of the weight 17 by the resin part 17c and the second resin part 17d. Accordingly, the metal part 17a is protected from corrosion due to moisture. Hence, degradation of the semiconductor sensor can be prevented. In addition, according to the resin part 17c, the metal part 17a is prevented from colliding against the glass substrate 29 so as to protect the metal part 17a and the glass substrate 29 from damage.

The semiconductor sensor according to the embodiment shown in FIGS. 9A and 9B can be formed in the same manner as the manufacturing method of the embodiments described with reference to FIGS. 2A through 7D.

Figure 9C:
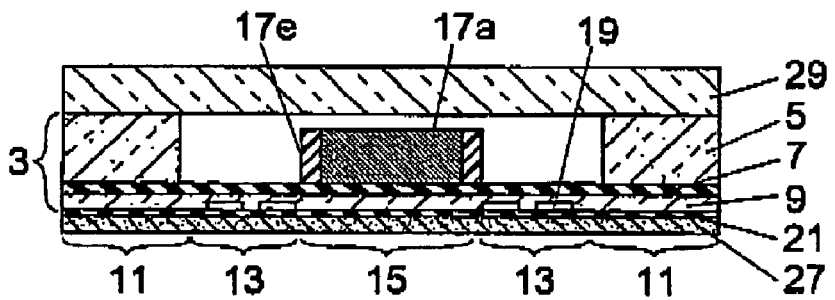

In the embodiment shown in FIG. 9C, a third resin part 17e having a frame-shape is provided surrounding the weight arranging part 15. The metal part 17a is provided in a concave part formed by the third resin part 17e and the weight arranging part 15. Hence, even if a fluid material is used for the metal part 17a upon forming the metal part 17a, the metal part 17a can be formed in a predetermined region since the region where the metal part 17a is to be formed is delimited by the concave part formed by the third resin part 17e and the weight arranging part 15.

Figure 9D:
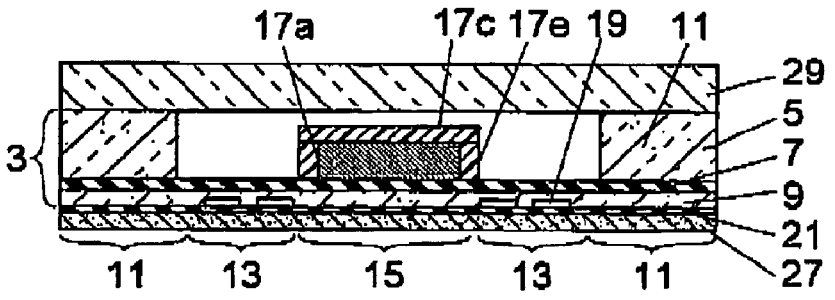
Figure 10A:
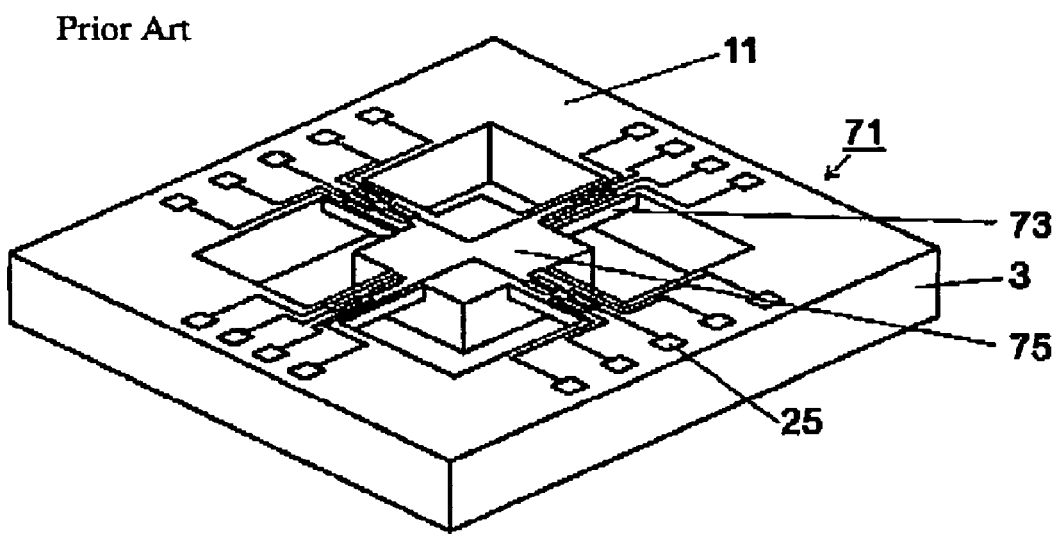
FIGS. 10A through 10D are views illustrating a conventional semiconductor sensor.
Figure 10B:
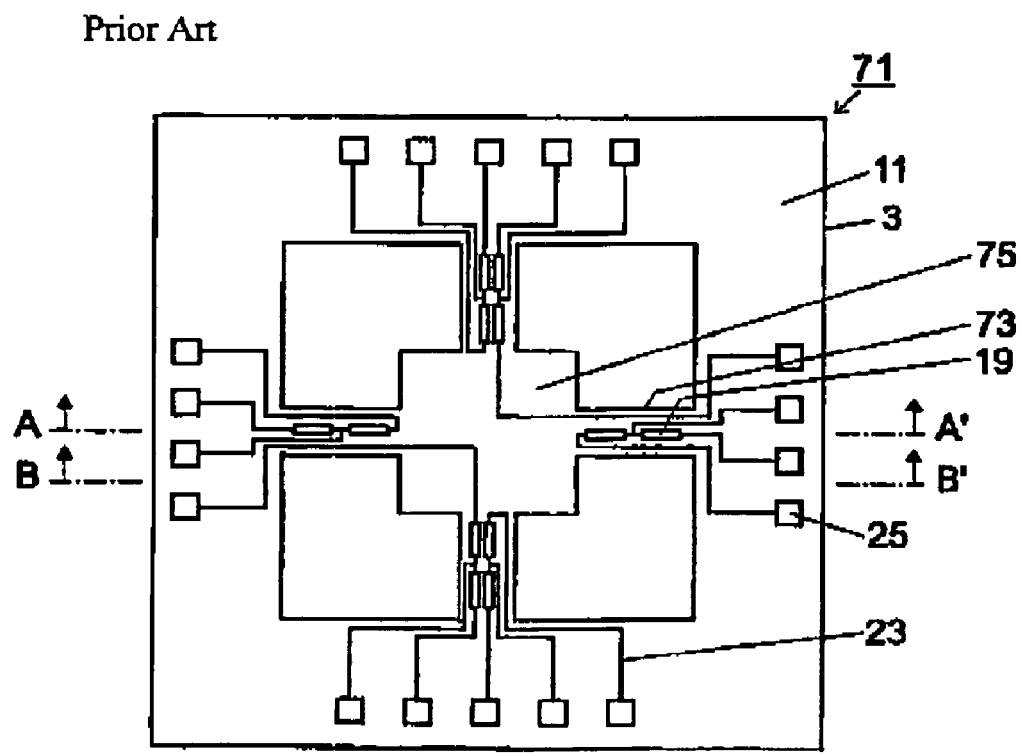
Figure 10C:
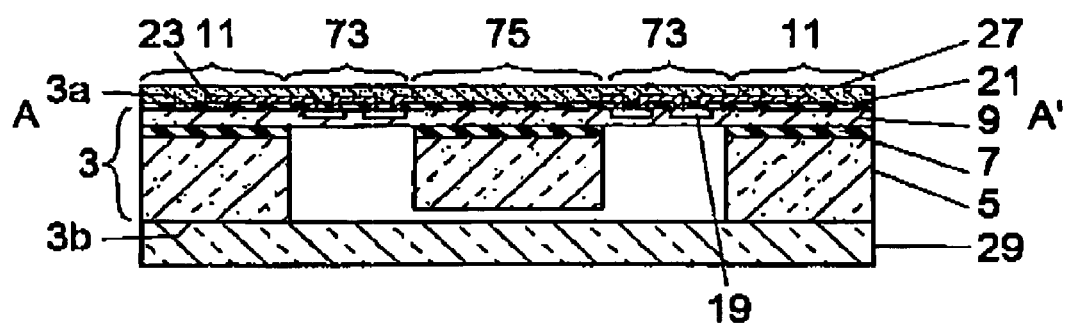
Figure 10D:
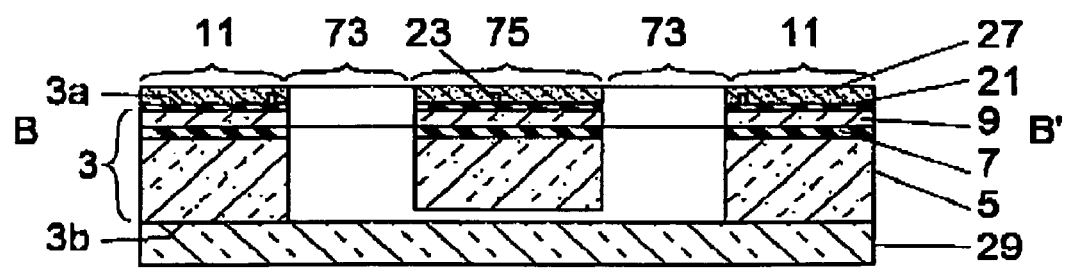
Figure 11A:
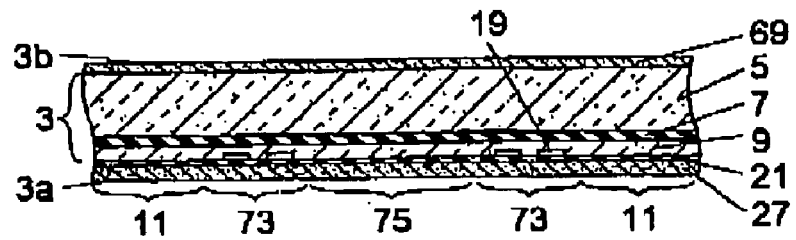
FIGS. 11A through 11F are cross-sectional views illustrating steps of a manufacturing method of the conventional semiconductor sensor.
Figure 11B:
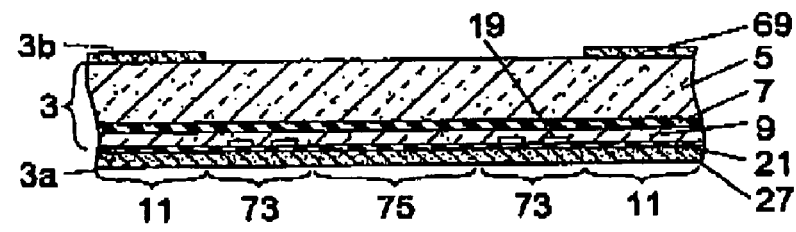
Figure 11C:
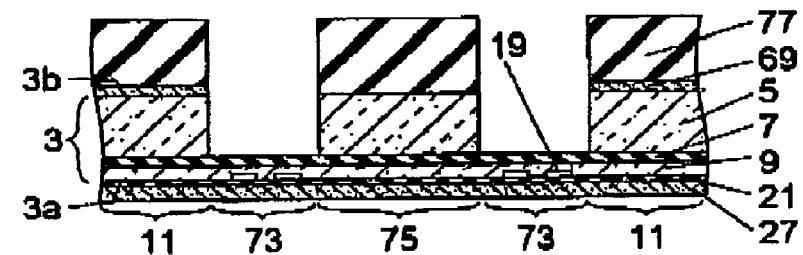
Figure 11D:
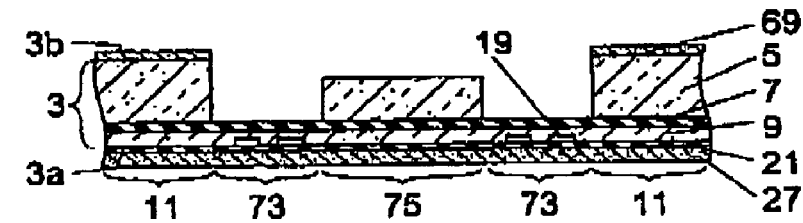
Figure 11E:
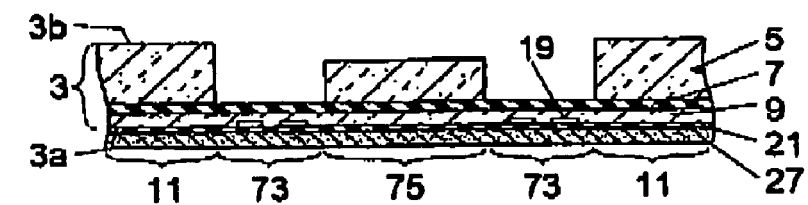
Figure 11F:
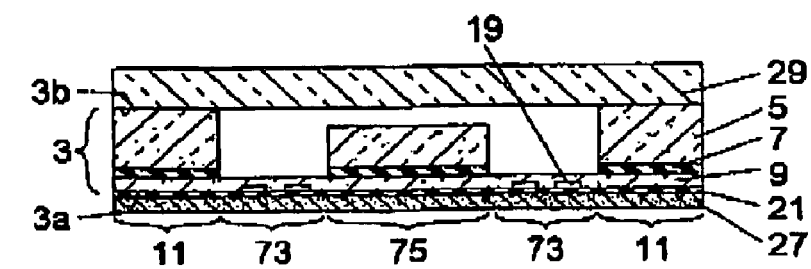

In the embodiment shown in FIG. 9D, in comparison to the embodiment shown in FIG. 9C, the resin part 17c is formed so as to cover the third resin part 17e having a frame-shape formed around the weight arranging part 15 and the metal part 17a formed therein. Since the resin part 17c is provided on the metal part 17a, the metal part 17a is prevented from colliding against the glass substrate 29 so as to protect the metal part 17a and the glass substrate 29 from damage.

In the embodiment shown in FIG. 9D, in comparison to the embodiment shown in FIG. 9C, the resin part 17c is provided on the metal part 17a and the third resin part 17e. Hence, the metal part 17a is prevented from contacting the surrounding atmosphere of the weight 17 by the resin part 17c, the third resin part 17e, and the weight arranging part 15. Hence, the metal part 17a is protected from corrosion due to moisture so as to prevent degradation of the semiconductor sensor. In addition, according to the resin part 17c, the metal part 17a is prevented from colliding against the glass substrate 29 so as to protect the metal part 17a and the glass substrate 29 from damage.

Further, the present invention is not limited to these embodiments, but variations and modifications may be made without departing from the scope of the present invention. The condition of the manufacturing method such as size, shape, material, arrangement, temperature and the like is shown as an only example.

For example, as the metal paste including the metal, silver paste including the silver is used, but the material of the metal is not limited to this. For example, gold, platinum, titanium, copper, bismuth, nickel, and the like can be used.

Further, according to the manufacturing method of the present embodiment, the weight 17 is formed before attaching and cutting the glass board 29, but the manufacturing method of the present embodiment is not limited to this. After the flexible parts 13 and the weight arranging part 15 are formed, the semiconductor sensor may be diced into chips. Thereafter, the weight 17 may be formed and a tip of glass may be applied to each of the chips. In this case, an influence on the weight 17 according to mechanical oscillation caused by dicing the semiconductor sensor or water pressure is lowered. Hence, a defect of the flexible parts 13 can be prevented.

Moreover, in the manufacturing method according to the above described embodiment, the weight 17, the metal part 17a, and the resin parts 17b, 17c, 17d, and 17e are formed while the SOI substrate 3 is being heated, but the method is not limited to this.

If a high volatile solvent is used in the liquid material for the weight, the weight 17 can be formed without heating the SOI substrate 3. For example, referring to forming the metal part 17a, as shown in FIGS. 9A through 9D, if the metal part 17a is formed in the concave part formed by the resin part 17d or 17e, a metal paste having high fluidity including the highly volatile solvent may be used as the metal paste for the metal part 17a.

Furthermore, as the etching method of the manufacturing method of the present embodiment, dry etching or wet etching may be used.

According to at least one embodiment of the present invention, the liquid material for the weight has fluidity enough for squirting from an exhaust nozzle. It should be noted that the weight forming step is not limited to using the liquid material for the weight. For example, a solid weight may be mounted on the weight arranging part so as to form a weight in the semiconductor sensor.

According to at least one embodiment of the present invention, in the weight forming step, the liquid material for the weight is dripped from the exhaust nozzle onto the weight arranging part and hardened so as to form the weight. Accordingly, the weight can be easily and accurately formed by utilizing an exhaust nozzle having a structure similar to that of the printer head of a piezo type (also called a piezo jet type) printer head used in an inkjet printer.

According to at least one embodiment of the present invention, if the weight is made of a material including metal having a relative density greater than the metal included in the material of the weight arranging part and the flexible parts, for example, a metal paste, in comparison to the conventional semiconductor sensor in which the weight and the flexible parts are made of the same material, the volume of the weight can be reduced while the sensitivity of the sensor is maintained by the weight having the same weight (gravity effect). Accordingly, the surface area of the weight is reduced so that the area of the semiconductor sensor can be reduced. In addition, if the weight includes the same volume as the weight of the conventional semiconductor sensor, the weight (gravity effect) of the weight can be increased so as to improve the sensitivity of the semiconductor sensor.

According to at least one embodiment of the present invention, the weight includes a metal part comprising a metal paste including the metal formed on the weight arranging part and a resin part constituted of the resin formed on the metal part. Hence, the metal part is prevented from colliding with a regulating board such as a glass substrate arranged on the other side (opposite to the side on which the flexible part is formed) of the semiconductor sensor, which regulating board regulates the scope of the movement of the weight. Therefore, a defect of the regulating board and the metal part can be prevented.

According to at least one embodiment of the present invention, the weight includes a second resin part comprising the resin formed on the weight arranging part and the metal part constituted of the metal paste including the metal formed on the second resin part. Hence, the center of gravity of the weight can be arranged at a position far from the weight arranging part. Accordingly, the sensitivity of the sensor can be improved.

According to at least one embodiment of the present invention, if the second resin part functions as an adhesion improving layer for improving the adhesion between the weight arranging part and the metal part, the weight is prevented from separating from the weight arranging part.

According to at least one embodiment of the present invention, if the semiconductor sensor including the metal part formed on the second resin part further includes a resin part comprising the resin on the metal part, the metal part is prevented from colliding with a regulating board such as a glass substrate arranged on the other side of the semiconductor sensor, which regulating board regulates the scope of the movement of the weight. Therefore, a defect of the regulating board and the metal part can be prevented.

According to at least one embodiment of the present invention, if the unhardened resin is the same as the second unhardened resin, the same exhaust nozzle can be used for squirting the unhardened resin and the second unhardened resin. Hence, the number of exhaust nozzles to be used can be reduced.

According to at least one embodiment of the present invention, the resin part covers the metal part so as to prevent the metal part from contacting the surrounding atmosphere. Hence, the metal part is shut out from the surrounding atmosphere so as to be protected from corrosion due to moisture. Therefore, degradation of the semiconductor sensor is prevented.

According to at least one embodiment of the present invention, if the metal includes magnetic metal, the magnetic field is used for performing a sensitivity test of the semiconductor sensor.

According to at least one embodiment of the present invention, the weight is made of only the same resin. Where the volume of the weight is the same as the volume of the weight comprising the metal paste, the weight (gravity effect) of the semiconductor sensor can be reduced.

According to at least one embodiment of the present invention, the region of the second semiconductor layer where the weight arranging part and the flexible parts are formed is removed by using the insulating layer as the etching stopper layer. Therefore, when the region of the second semiconductor layer where the flexible parts and the weight arranging part are formed is removed by the etching, it is possible to control the depth to be etched easily. Hence, the accuracy of the film thickness of the flexible part can be improved. Hence, the sensitivity of the semiconductor sensor can be improved.

The present application is based on Japanese Priority Application No. 2005-066342 filed on Mar. 9, 2005, with the Japanese Patent Office, the entire contents of which are hereby incorporated by reference.

What is claimed is:

1. A semiconductor sensor, comprising:
a substrate including at least a semiconductor layer, said substrate including:
a weight arranging part in a vicinity of a center of the substrate;
a flexible part around the weight arranging part; and
a supporting part provided around the flexible part; and
a weight arranged on the weight arranging part,
wherein said weight is made of a material different from that of the weight arranging part and the flexible part, and
said weight comprises
a resin part provided on the weight arranging part, said resin part being made of resin, and
a metal part provided on the resin part, said metal part including at least a metal.

2. The semiconductor sensor as claimed in claim 1, wherein said metal has a relative density greater than a relative density of the material comprising the weight arranging part and the flexible part.

3. The semiconductor sensor as claimed in claim 2, wherein said weight further comprises:
another resin part made of resin, said another resin part being formed on the metal part.

4. The semiconductor sensor as claimed in claim 3, wherein said another resin part covers the metal part so as to prevent the metal part from contacting a surrounding atmosphere.

5. The semiconductor sensor as claimed in claim 1, wherein said metal part of said weight is made of metal paste including said metal.

6. The semiconductor sensor as claimed in claim 1, wherein said metal includes a magnetic metal.

7. The semiconductor sensor as claimed in claim 1, wherein the weight arranging part, the supporting part, and the flexible part are formed by processing an SOI substrate comprising a semiconductor layer, an insulating layer, and a second semiconductor layer being laminated in order from a surface of the SOI substrate, wherein
the weight arranging part and the flexible part include at least the semiconductor layer, and
the supporting part includes at least the semiconductor layer, the insulating layer, and the second semiconductor layer.

8. A semiconductor sensor comprising:
a substrate including at least a semiconductor layer, said substrate including:
a weight arranging part in a vicinity of a center of the substrate,
a flexible part around the weight arranging part, and
a supporting part provided around the flexible part; and
a weight arranged on the weight arranging part,
wherein said weight is made of a material different from that of the weight arranging part and the flexible part,
said material of the weight includes at least metal having a relative density greater than a relative density of the material comprising the weight arranging part and the flexible part, and
said weight comprises:
a resin part provided on the weight arranging part, said resin part being made of resin; and
a metal part provided on the resin part, said metal part being made of a metal paste including the metal.

9. The semiconductor sensor as claimed in claim 8, wherein said resin part functions as an adhesion improving layer to improve adhesion between the weight arranging part and the metal part.

10. The semiconductor sensor as claimed in claim 9, wherein said weight further comprises:
another resin part made of resin, said another resin part being formed on the metal part.

11. The semiconductor sensor as claimed in claim 10, wherein said another resin part covers the metal part so as to prevent the metal part from contacting a surrounding atmosphere.

12. The semiconductor sensor as claimed in claim 8, further comprising another resin part on the metal part, said another resin part being made of resin.

13. The semiconductor sensor as claimed in claim 8, wherein said metal includes a magnetic metal.

14. The semiconductor sensor as claimed in claim 9, wherein the weight arranging part, the supporting part, and the flexible part are formed by processing an SOI substrate comprising a semiconductor layer, an insulating layer, and a second semiconductor layer being laminated in order from a surface of the SOI substrate, wherein the weight arranging part and the flexible part include at least the semiconductor layer, and the supporting part includes at least the semiconductor layer, the insulating layer, and the second semiconductor layer.

* * * * *